United States Patent [19]
Komiya

[11] Patent Number: 6,085,072
[45] Date of Patent: Jul. 4, 2000

[54] TELEPHONE SYSTEM AND VOICE ENCODING/DECODING METHOD

[75] Inventor: Kozo Komiya, Tokyo, Japan

[73] Assignee: Sony Corporation, Tokyo, Japan

[21] Appl. No.: 08/833,969

[22] Filed: Apr. 11, 1997

[30] Foreign Application Priority Data

Apr. 15, 1996 [JP] Japan .................................. 8-118274

[51] Int. Cl.[7] .................................................. H04B 1/44
[52] U.S. Cl. ........................ 455/83; 455/82; 455/134; 455/570; 370/286; 379/406
[58] Field of Search .................. 455/78, 79, 82, 455/83, 84, 134, 101, 132, 133, 272, 273, 277.1, 570; 379/406, 407, 410, 411; 370/286, 287, 289

[56] References Cited

U.S. PATENT DOCUMENTS

| | | | |
|---|---|---|---|
| 4,513,412 | 4/1985 | Cox | 455/134 |
| 5,170,490 | 12/1992 | Cannon et al. | 455/84 |
| 5,276,914 | 1/1994 | Ishizuka et al. | 455/83 |

*Primary Examiner*—Nguyen Vo
*Assistant Examiner*—Sam Bhattacharya
*Attorney, Agent, or Firm*—Jay H. Maioli

[57] ABSTRACT

A telephone system and a voice encoding/decoding method capable of reducing the consumed power by reducing the memory capacity of buffer and generating high-tone-quality voice. The system writes an input voice frame to an input buffer and eliminates the delayed disturbance in a voice signal from the input voice frame based on the output voice frame to execute echo-canceling, and decodes the received voice packet data, so that the boundary of input voice frames can be set before the boundary of output voice frames, at least, for the time necessary for the echo-canceling and decoding. Thereby, the output voice frame can always be written at the same time as the input voice frame written to the input buffer and the delayed disturbance in the voice signal can be eliminated from the input voice frame based on the output voice frame and, thus the high-tone-quality voice can be generated.

8 Claims, 8 Drawing Sheets

INPUT VOICE FRAME

| INPUT FRAME 1 | INPUT FRAME 2 | INPUT FRAME 3 |
|---|---|---|

OUTPUT VOICE FRAME

| OUTPUT FRAME 1 | OUTPUT FRAME 2 | OUTPUT FRAME 3 |
|---|---|---|

FIG. 2 (RELATED ART)

INPUT VOICE FRAME

| INPUT FRAME 1 | INPUT FRAME 2 | INPUT FRAME 3 |
|---|---|---|

OUTPUT VOICE FRAME

| OUTPUT FRAME 1 | OUTPUT FRAME 2 | OUTPUT FRAME 3 |
|---|---|---|

TELEPHONE SYSTEM AND VOICE ENCODING/DECODING METHOD

BACKGROUND OF THE INVENTION

1. Field of the Invention

The present invention relates to a telephone system and a voice encoding/decoding method, and is applicable to a mobile terminal device of the cellular system referred to as the PCS (Personal Communication Service) system in the United States of America, for example.

2. Description of the Related Art

In the United States, the cellular system referred to as the PCS system applying the CDMA (Code Division Multiple Access) method defined in the EIA/TIA (Electronics Machinery Industries Association/American Telecommunication Industries Association) IS-95A and the ANSI (American National Standards Institute, Inc.) J-STD008, has been proposed.

The PCS system is mainly composed of a mobile terminal device and a plurality of base station devices, and these communicate to each other in the CDMA method by providing a radio circuit in the between the mobile terminal device and the base station device.

Applying the CDMA method as the communication method, the PCS system obtains the merit that the system capacity can be increased to approximately ten times, compared with the case where the conventional analog method has been applied.

The mobile terminal device in this PCS system generally has the echo-canceling function and the side-back-toning function. Here the echo-canceling function is a function to eliminate a short delayed disturbance in a voice signal of 2 [ms] which is entered to a microphone by propagating in the box part of device itself from the speaker of device.

And the side-back-toning function is a function to supply the user's voice entered from the microphone together with the voice of the other party received by the speaker so that the user can hear his own voice through the speaker when talking.

FIG. 1 shows the construction of mobile terminal device having the echo-canceling function and the side back toning function. The mobile terminal device 1 is composed of the receiving system (the lower part of FIG. 1) and the transmitting system (the upper part of FIG. 1).

In the receiving system, a receiving signal S1 received by an antenna 2 is sent to an RF amplifier 4 via a multiplexer 3. The RF amplifier 4 amplifies the receiving signal S1 to the predetermined power level and sends the amplified receiving signal S1 to a demodulator 5. The demodulator 5 extracts voice packet data S2 from the receiving signal S1 and sends the voice packet data S2 to a voice decoder 6.

The voice decoder 6 decodes the voice packet data S2 and once writes to a buffer 7 the voice data S3. The buffer 7 transfers one frame of the output voice frame in the voice data S3 to an output buffer 8 as voice sample data S4. The output buffer 8 has the capacity enough to store one output voice frame.

Then a digital-to-analog converter 9 converts the voice sample data S4 from the output buffer 8 to an analog signal S5 and sends the analog signal S5 as voice via a speaker 10.

In the transmitting system, the analog signal S6 such as the voice obtained by a microphone 11 is sent to an analog-to-digital converter 12. The analog-to-digital converter 12 converts the analog signal S6 to the digital data and writes to an input buffer 13 the voice sample data S7. At this time, the voice sample data S4 (the output voice frame for one frame) will be transferred, and written to the output buffer 8 from the buffer 7 at the same timing that the voice sample data S7 for one frame has written to the input buffer 13 as the input voice frame.

Considering that the echo-canceling and the voice-decoding requires time, the voice sample data S4 (the output voice frame) is transferred to the output buffer 8 one frame by one frame after the buffer 7 writes the voice data S3 once, at the timing that the voice sample data S7 has written to the input buffer 13 as one input voice frame.

FIG. 2 shows the relation for each frame of the voice sample data S4 and S7 written to the output buffer 8 and the input buffer 13 at the same timing respectively. As shown in FIG. 2, the voice sample data S7 written to the input buffer 13 and the voice sample data S4 written to the output buffer 8 have the same boundary between frames.

Therefore, in the mobile terminal device 1, when the echo-canceling is performed, an echo canceler 14 can eliminate a delayed disturbance in a voice signal from an input voice frame 1 based on the output voice frame 1 which has the same boundary as the input voice frame 1, and newly rewrite the voice sample data S7.

FIG. 3 shows the operational timing of the echo-canceling. Since the output voice frame has been written to the output buffer 8 at the same timing that the input voice frame has been written to the input buffer 13 as the operational timing of the DSP unit in the mobile terminal device 1, decoding of the voice packet data S2 is started by the voice decoder 6 at the timing "A" in FIG. 3 and the output voice frame for 1 frame is transferred from the buffer 7 to the output buffer 8.

At this time, the input voice frame for one frame has been written in the input buffer 13 and the echo-canceling is performed at the timing "B" in FIG. 3 based on the output voice frame written to the output buffer 8 and, thereafter, the input voice frame that is echo-canceled is encoded at the timing "C" in FIG. 3.

Specifically, the echo canceler 14 forecasts the delayed disturbance in the voice signal based on the voice sample data S4 of one output voice frame written in the output buffer 8 to eliminate the delayed disturbance in the voice signal from the voice sample data S7, and newly once writes to the input buffer 13 the voice sample data S8 and outputs the voices sample data S8 to a voice encoder 15.

The voice encoder 15 encodes the voice sample data S8 that is echo-canceled and stored for several frames to generate a voice packet data S9 and outputs it to a modulator 16. The modulator 16 modulates the voice packet data S9 and outputs to an RF amplifier 17 as a transmission signal S10. The RF amplifier 17 amplifies the transmission signal S10 to a predetermined power level and transmits it from the antenna 2 via the multiplexer 3.

On the other hand, the voice data S7 converted to the digital data by the analog-to-digital converter 12 is subjected to the side-back-toning by output from the speaker 10 via the digital-to-analog converter 9. The side-back-toning causes that the user can hear his voice together with the other party's voice when talking from the speaker 10.

FIG. 4 shows a series of processing to perform the echo-canceling and the side-back-toning. Here the processing of one voice frame will be described.

In the mobile terminal device 1, the processing enters from the beginning step RT1 and proceeds to step SP1. At step SP1 in the mobile terminal device 1, when talking is started, each module of the echo canceler 14, voice encoder 15 and voice decoder 6, and the input buffer 13 and output buffer 8 are initialized.

At step SP2 in the mobile terminal device 1, the reception signal S1 received via the antenna 2, multiplexer 3 and RF amplifier 4, is extracted as the voice packet data S2 by the demodulator 5 and output to the voice decoder 6 of the DSP unit. At this time, the mobile terminal device 1 determines whether the voice decoder 6 receives the voice packet data S2.

When the voice decoder 6 does not receive the voice packet data S2, a negative result is obtained and the process returns to step SP2 again. This processing will be repeated until the voice decoder 6 receives the voice packet data S2. And when the voice decoder 6 received the voice packet data S2, an affirmative result is obtained and the process proceeds to step SP3.

At step SP3 in the mobile terminal device 1, the voice packet data S2 is decoded into the voice data S3 by the voice decoder 6, and the process proceeds to step SP4.

At step SP4 in the mobile terminal device 1, the voice sample data S7 which has been picked up by the microphone 11 when talking was started and converted via the analog-to-digital converter 12, is output to the speaker 10 and subjected to the side-back-toning processing. Here the side-back-toning is performed from the beginning of talking to the end of talking.

Then in the mobile terminal device 1, at step SP5 the voice data S3 decoded by the voice decoder 6 is once written to the buffer 7 and thereafter, the voice sample data S4 (output voice frame) is transferred to the output buffer 8 frame by frame. At this time, whether one frame of the voice sample data S7 written in the input buffer 13 has been written or not is determined by confirming the presence of the boundary between frames.

When the boundary cannot be confirmed, a negative result is obtained and this processing will be repeated until the voice sample data S7 can be perfectly transferred and the boundary can be confirmed. On the other hand, when the boundary can be confirmed, an affirmative result is obtained and the process proceeds to step SP6 determining that the voice sample data S7 of one frame (the input voice frame 1) can be perfectly transferred.

At step SP6 in the mobile terminal device 1, the delayed disturbance in the voice signal is eliminated from the one-frame voice sample data S7 (the input voice frame 1) based on the one-frame voice sample data S4 (the output voice frame 1) by the echo canceler 14 so as to rewrite in the input buffer 13 the new voice sample data S8. Then the process proceeds to step SP7.

In the mobile terminal device 1, at step SP7, the following one frame of the voice sample data S4 (the output voice frame 2) is transferred to the output buffer 8 from the buffer 7 to prepare to eliminate the delayed disturbance in the voice signal from the next input voice frame 2 and cancel the echo.

At step SP8, the voice sample data S8 (the input voice frame 1) that is echo-canceled later is encoded with the voice encoder 15 and the process proceeds to step SP9.

At step SP9, the mobile terminal device 1 determines whether the talking should be stopped or not. When the talking should not be stopped, a negative result is obtained and the process returns to step SP2 to perform the echo-canceling and the side-back-toning of the next voice frame. When the talking should be stopped, an affirmative result is obtained and the process proceeds to step SP10 and the processing is stopped.

As described above, in the mobile terminal device 1, the echo-canceling has been performed based on the voice sample data S4 (the output voice frame) having the same boundary between frames as the voice sample data S7 (the input voice frame).

By the way, in the mobile terminal device 1 having the above construction, when echo-canceling, the echo canceler 14 eliminates the delayed disturbance in the voice signal from the voice sample data S7 (e.g., the input voice frame 1) based on the voice sample data S7 transferred to the output buffer 8 (e.g., the output voice frame 1) and writes the new sample data S8.

However, since the output buffer 8 has the memory capacity only for one frame, when the buffer 7 transfers the voice data S3 to the output buffer 8 in succession, it is caused that the output voice frame 1 at the same time as the input voice frame 1 is written in the input buffer 13 is sent away from the output buffer 8 and the output voice frame 2 is transferred to the output buffer 8, thus the echo-canceling could not be done.

Therefore, when performing the echo-canceling, the mobile terminal device 1 must once write the voice data S3 decoded by the voice decoder 6 to the buffer 7 and transfer the voice sample data S4 for one frame (the output voice frame 1) at the timing that the voice sample data is written to the input buffer 13 (the input voice frame 1). There has been a problem that the processing has been complicated.

Furthermore, the mobile terminal device 1 sends the voice sample data S7 converted by the microphone 11 and the analog-to-digital converter 12 to the speaker 10 via the digital-to-analog converter 9 to perform the side-back-toning. Therefore, there has been a problem that the voice that is not echo-canceled is generated from the speaker 10 and the tone quantity is low.

SUMMARY OF THE INVENTION

In view of the foregoing, an object of the present invention is to provide a telephone system and a voice encoding/decoding method capable of reducing the consumed power by reducing the memory capacity of buffer and outputting the high-tone-quality voice.

The nature, principle and utility of the invention will become more apparent from the following detailed description when read in conjunction with the accompanying in which like parts are designated by like reference numerals or characters.

BRIEF DESCRIPTION OF THE DRAWINGS

In the accompanying drawings:

FIG. 2 is a schematic diagram showing the relation between input voice frame and output voice frame in the conventional example;

FIG. 6 is a schematic diagram showing the relation between input voice frame and output voice frame according to the embodiment of the present invention;

DETAILED DESCRIPTION OF THE EMBODIMENT

Figure 1:
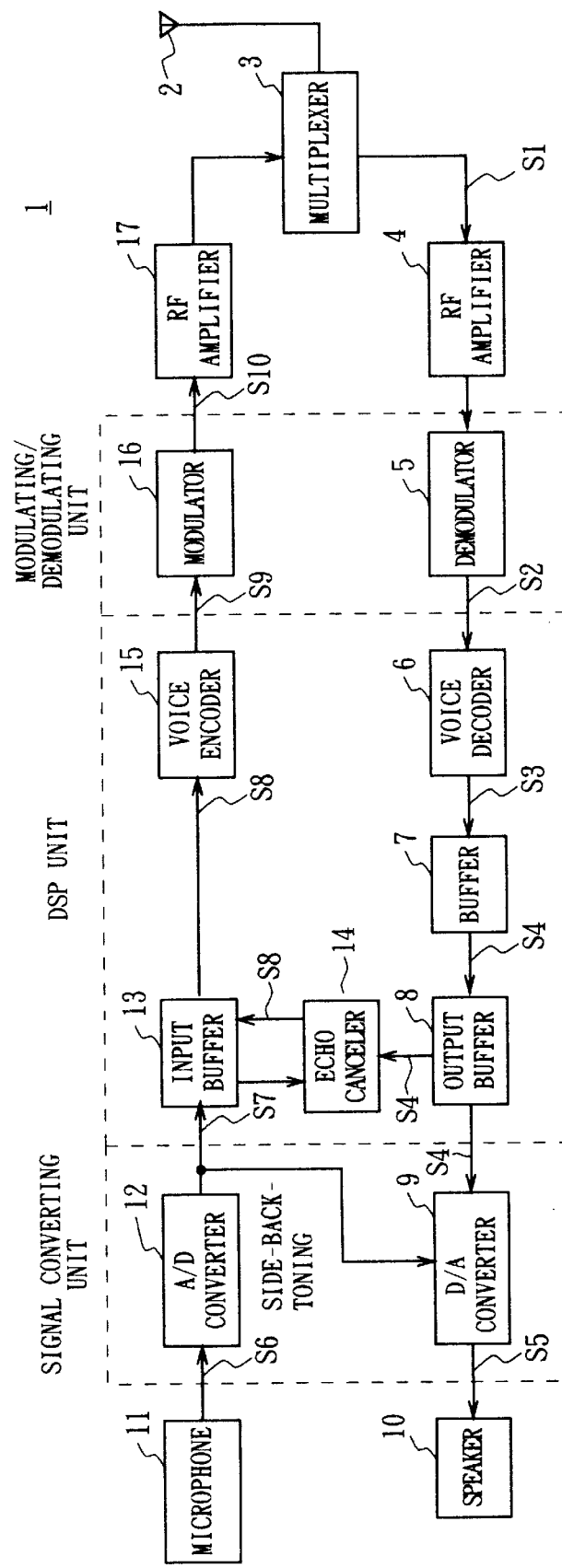
FIG. 1 is a block diagram showing the construction of conventional mobile terminal device.
Figure 3:
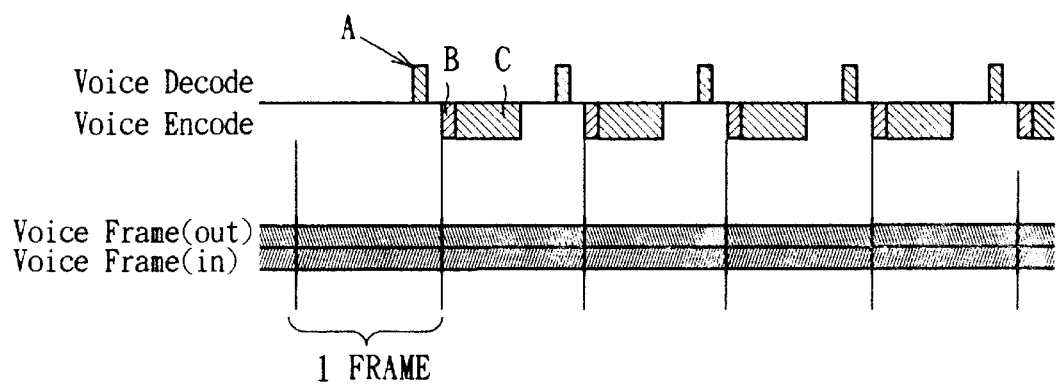
FIG. 3 is a timing chart illustrating the operational timing in echo-canceling in the conventional example.
Figure 5:
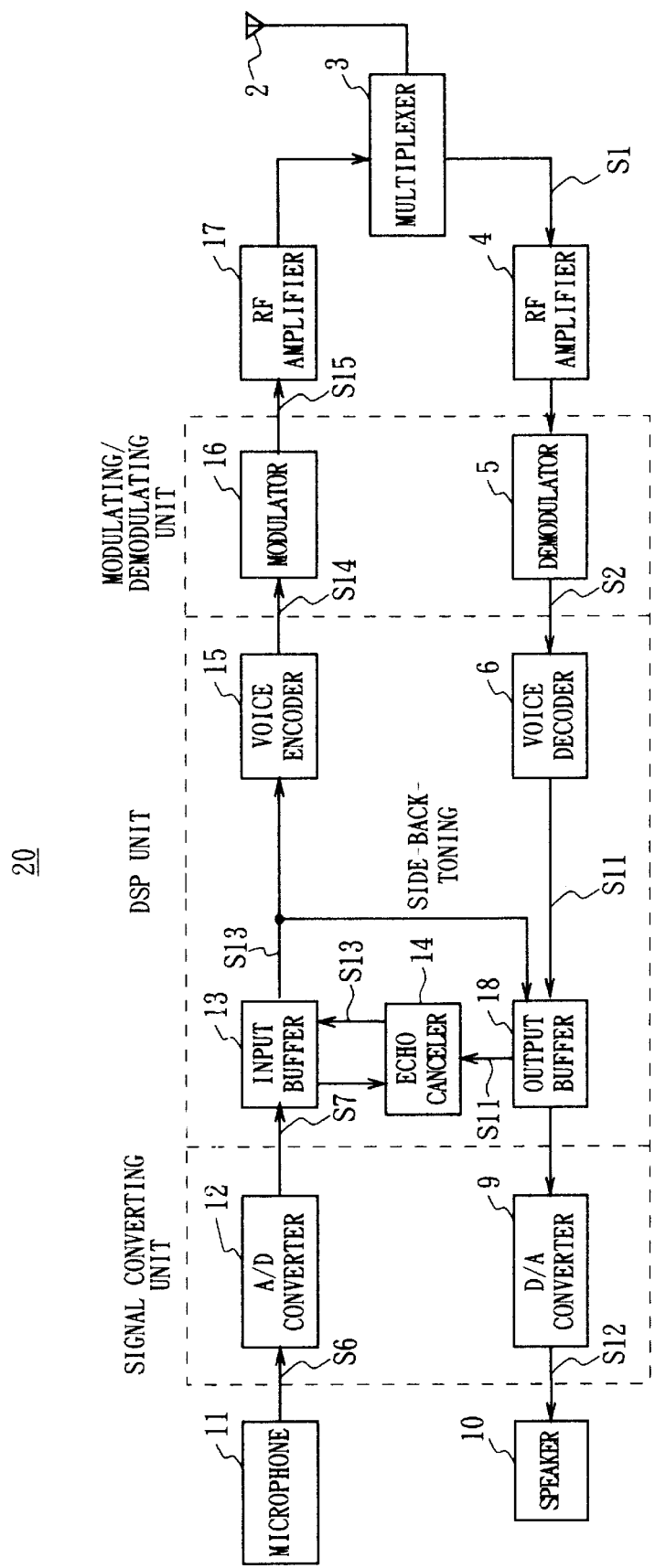
FIG. 5 is a block diagram showing the construction of mobile terminal device according to an embodiment of the present invention.

Preferred embodiment of the present invention will be described with reference to the accompanying drawings:

Referring to FIG. 5 in which the same numerals are added to the corresponding part of FIG. 1, a mobile terminal device 20 according to the present invention is constructed similarly to the mobile terminal device 1 except that the buffer 7 from the mobile terminal device 1 is omitted (FIG. 1) and an output buffer 18 is newly provided instead of the output buffer 8.

In the receiving system, a receiving signal S1 received with an antenna 2 is sent to a demodulator 5 via a multiplexer 3 and an RF amplifier 4. The demodulator 5 extracts voice packet data S2 from the receiving signal S1 and sends the voice packet data S2 to a voice decoder 6.

The voice decoder 6 decodes the voice packet data S2 considering the time for echo-canceling and voice-decoding so that the boundary of the output voice frames becomes 3 [ms] later than the input voice frame written to the input buffer 13 (the voice sample data S7), and 3 [ms] is the maximum time necessary for the echo-canceling and decoding. The decoded data is then written the output buffer 18 as the voice data S11.

Here, the output buffer 18 has the memory capacity capable of storing the output voice frame for one frame and the voice data delayed for 3 [ms]. Thus, the state where the output voice frame having the same time as the input voice frame written to the input buffer 13 is always written can be kept.

Then, a digital-to-analog converter 9 converts the voice data S11 to the analog signal S12 and outputs the voice through a speaker 10 as In the transmitting system, the analog signal S6 such as the voice obtained by a microphone 11 is converted to the digital data via an analog-to-digital converter 12 and written to the input buffer 13 as the voice sample data S7.

At this time, the voice sample data S7 is sequentially written to the input buffer 13 and the voice sample data S11 (for 3 [ms]+1 frame) is written to the output buffer 18 at the timing that the voice sample data for one frame in the input voice frame has been stored.

FIG. 6 shows the relation of the voice sample data S11 written to the output buffer 18 and the voice sample data S7 written to the input buffer 13 in each frame unit. As shown in FIG. 6, the output voice frame of the voice sample data S11 written to the output buffer 18 is delayed for 3 [ms] relative to the input voice frame of the voice sample data S7 written to the input buffer 13 in the boundary of respective frames.

Furthermore, since the output buffer 18 has the memory capacity capable of storing one frame of output voice frame and the voice data for 3 [ms] or more, the output voice frame will not be once written to the buffer 7 and transferred to the output buffer 8 frame by frame as in the conventional mobile terminal device 1.

Accordingly, the mobile terminal device 20 can keep the state where the output voice frame is always written to the output buffer 18 at the same time as the input voice frame is written to the input buffer 13 and thus the echo-canceling can be performed without the buffer 7 in the conventional mobile terminal device 1.

Specifically, in an echo canceler 14, a delayed disturbance in a voice signal is predicted based on the voice sample data S11 being the output voice frame for one frame written to the output buffer 18 and eliminates said delayed disturbance in the voice signal from the voice sample data S7, and then once rewrites it to the input buffer 13 as the new voice sample data S13 and sends the voice sample data S13 to a voice encoder 15.

The voice encoder 15 encodes the voice sample data S13 that is echo-canceled gathering several frames and generating voice packet data S14, and sends it to a modulator 16. The modulator 16 modulates the voice packet data S14 and sends to an RF amplifier 17 the transmitting signal S15. The RF amplifier 17 amplifies the transmitting signal S15 to the specified power level and transmits from the antenna 2 via the multiplexer 3.

Figure 7:
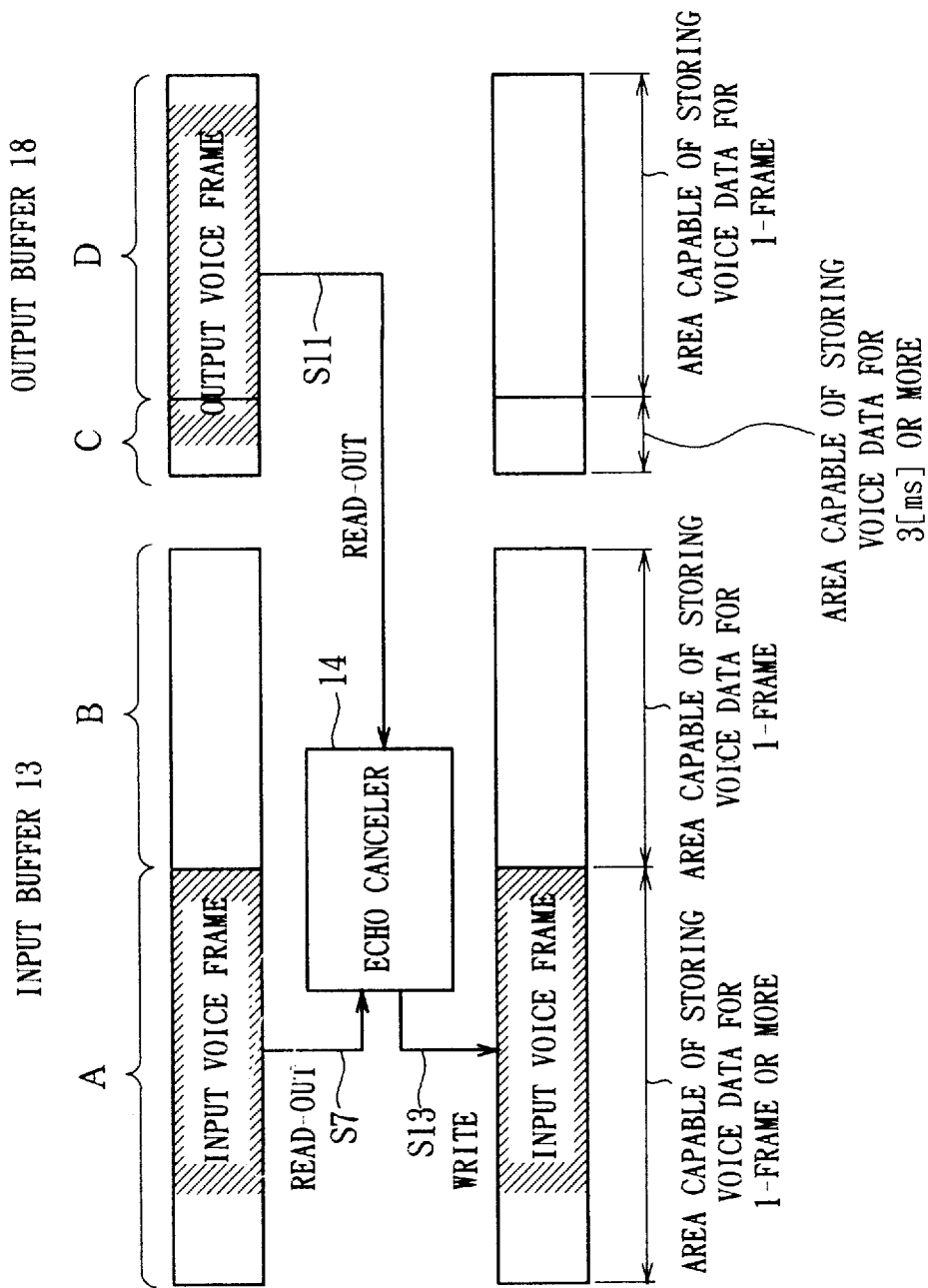
FIG. 7 is a schematic diagram showing the buffering state of input buffer and output buffer according to the embodiment of the present invention.

Then, FIG. 7 shows the state of input buffer 13 and output buffer 18 when the DSP unit as the digital signal processing means performs echo-canceling.

The input buffer 13 is a buffer area to read/write data when in the echo-canceling, and is divided into the area-A and the area-B. The area-A is a buffer area storing the voice data to be encoded by the voice encoder 15. It is required that the area-A is generally larger than one frame.

The area-B is a buffer area to store the voice data for one frame digitalized by the analog-to-digital converter 12. In this case, the input buffer 13 stores the voice data in area-B when framing is started, to write the voice sample data for one frame, and then the voice data is moved from the area-B to the area-A to execute the echo-canceling.

On the other hand, the output buffer 18 is a buffer area to store the voice sample data S11 read out when in the echo-canceler and is divided into the area-C and the area-D. The area-C is a buffer area to hold the voice sample data S11 which has not been sent yet when the voice decoder 6 decodes the voice packet data S2 and sends the voice sample data S11 to the digital-to-analog converter 9. It is required that area-C is capable of storing voice data at least for 3 [ms] that the echo canceler 14 additionally uses.

The area-D is a buffer area to store the voice sample data S11 for one frame which was decoded by the voice decoder 6. Note that, of the buffer areas, A,B,C,D the temporary and new data will be written at the right end.

The echo canceler 14 reads out one frame of the input voice frame 1 written in the input buffer 13 and cancels the echo based on the output voice frame 1 for one frame written in the output buffer 18, and once writes it to the area-A of the input buffer 13 as the new voice sample data S13.

Figure 8:
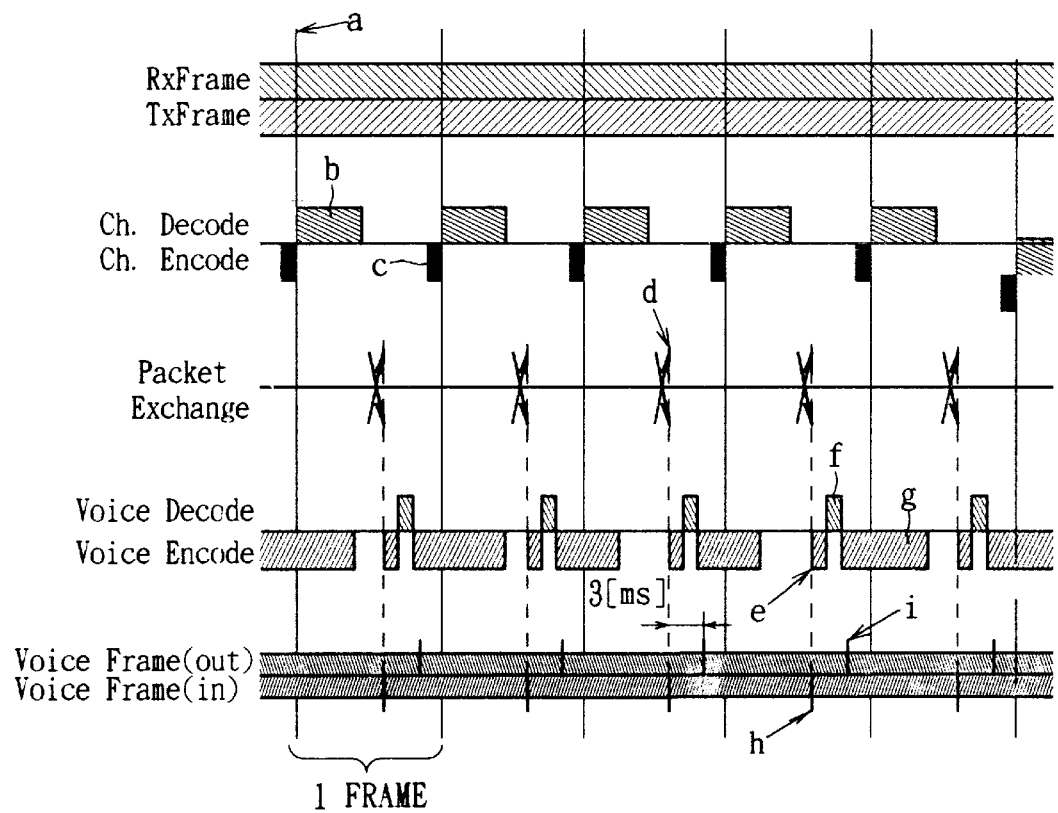
FIG. 8 is a timing chart illustrating the operational timing in echo-canceling according to the embodiment of the present invention.
Figure 4:
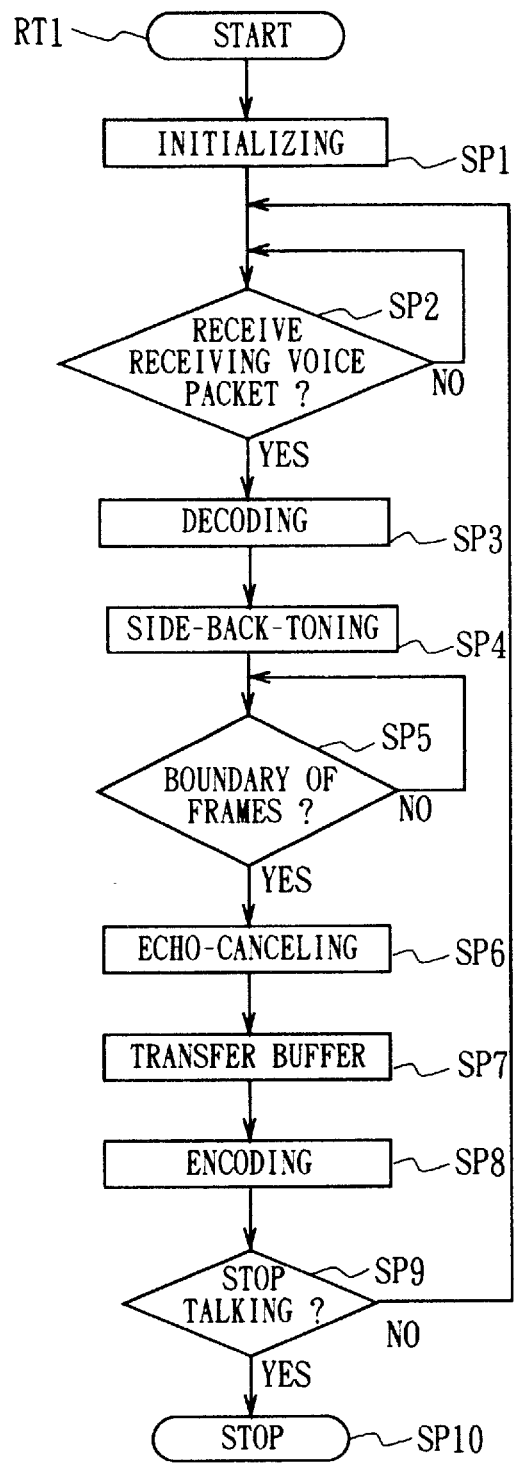
FIG. 4 is a flowchart showing a voice processing process in the conventional example.

FIG. 8 shows the operational timing in echo-canceling as follows: In the mobile terminal device 20, each processing is performed utilizing the timing denoted by "a" of the radio channel frame synchronizing signal which acts as the reference clock, Here, the timing denoted by "b" shows the timing that the demodulator 5 demodulates the receiving data and extracts the voice packet data S2. The timing denoted by "c" shows the timing that the modulator 16 modulates the voice packet data S14 and generates the transmitting data.

The timing denoted by "d" shows the timing that the demodulator 5 sends the voice packet data S2 to the DSP unit and the DSP unit sends the voice packet data S14 to the modulator 16. The timing denoted by "e" shows the operational timing of echo canceler 14 which starts just after the timing "h" when the input voice frame is begun.

Furthermore, the timing denoted by "f" shows the operational timing of the voice decoder 6 which starts just after the processing of echo canceler 14 has finished and stops before the timing "i" when the output voice frame is begun. The timing denoted by "g" shows the operational timing of the voice encoder 15 which starts just after the voice-decoding has finished and stops before the timing "d" when sending/receiving the voice packet data occurs.

Then, the timing denoted by "h" shows the timing that the input voice frame is begun, i.e., the timing for starting to store the voice sample data S7 from the analog-to-digital converter 12 to the area-B in the input buffer 13. The timing denoted by "i" shows the timing that the output voice frame is begun, i.e., the timing for starting to send the voice sample data S11 in the area-D of the output buffer 18 to the echo canceler 14 and the digital-to-analog converter 9.

In this connection, the timing "h" and the timing "i" are set so as to have a delay of 3 [ms] between each other, and 3 [ms] is the maximum time necessary for the echo-canceling and decoding.

According to the operational timing of the DSP unit, the DSP unit cancels the echo based on the output voice frame 1 when just on the boundary of the input voice frame 1, writes the output voice frame 2 decoded by the voice decoder 6 to the output buffer 18 to prepare for the echo-canceling of the following input voice frame 2, and encodes the input voice frame 1 that was just echo-canceled.

Here, of the shift of boundaries between the input voice frames and the output voice frames, 3 [ms] is suitable because when it becomes 3 [ms] or more, the user feels the incompatibility because the voice heard from the speaker 10 is delayed.

Figure 9:
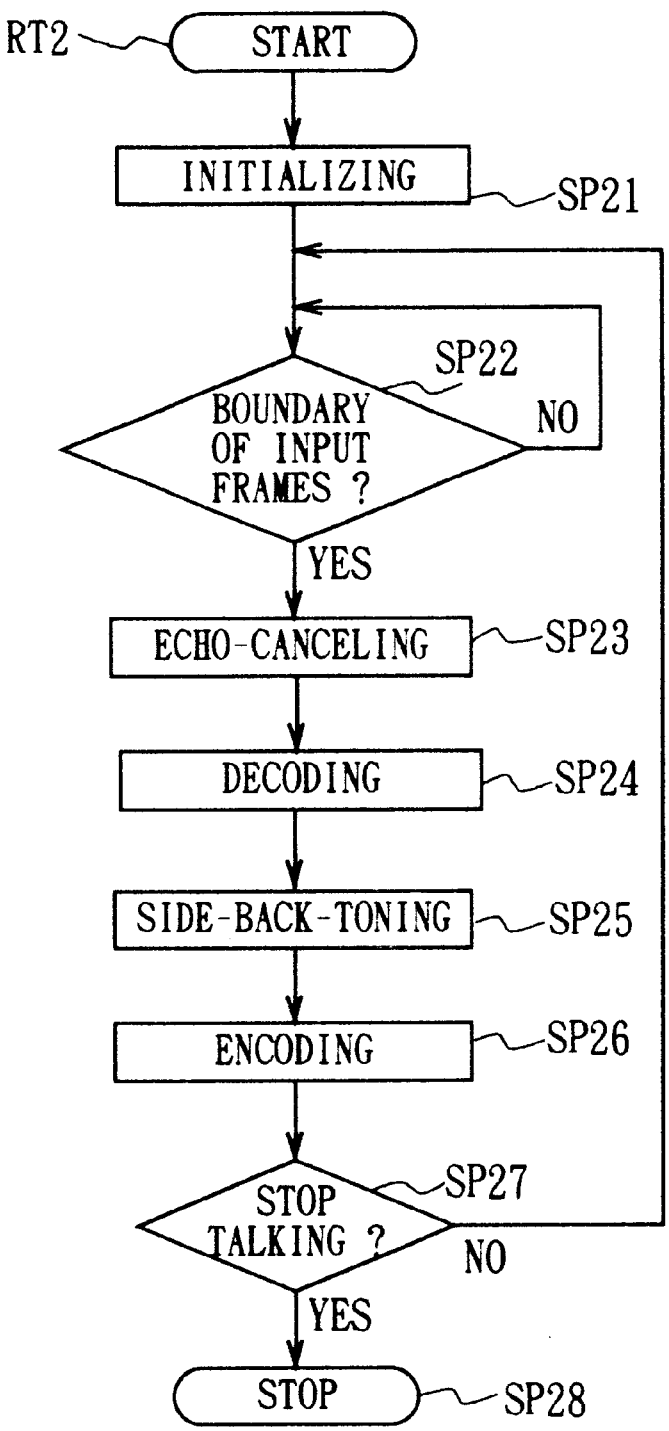
FIG. 9 is a flowchart showing a voice processing process according to the embodiment of the present invention.

FIG. 9 shows the processing of echo-canceling and side-back-toning based on the operational timing of the DSP unit as described above. In this connection, the processing of voice frame for one frame will be described.

The mobile terminal device 20 enters the processing from the starting step RT2 and proceeds to step SP21. In step SP21, when the talking is started, each module of the echo canceler 14, voice encoder 15 and voice decoder 6, and the input buffer 13 and output buffer 18 are initialized.

In step SP22, in the mobile terminal device 20, the analog-to-digital converter 12 converts the voice signal S6 to the digital data and starts to store the voice sample data S7 to the input buffer 13. At this time, since the DSP unit has no processing to perform exclusive of inputting the data, the DSP unit enters into the sleep mode to reduce the consumed power.

Then, the mobile terminal device 20 determines whether the boundary of input voice frame 1 is supplied or not to the input buffer 13. When the input buffer 13 has not received the boundary of input voice frame 1, a negative result is obtained and the mobile terminal device 20 returns to step SP22 again and waits until the boundary of input voice frame 1 is supplied. On the other hand, when it can be confirmed that the input buffer 13 received the boundary of input voice frame 1, an affirmative result is obtained and the mobile terminal device 20 determines that the voice sample data S7 (the input voice frame 1) necessary for the echo-canceling of one frame has written and proceeds to step SP23.

In step SP23, in the mobile terminal device 20, the echo canceler 14 eliminates the delayed disturbance in the voice signal from the input voice frame 1 written to the input buffer 13 based on the output voice frame 1 written to the output buffer 18 and rewrites the voice sample data S7 to the new voice sample data S13. Then, the mobile terminal device 20 proceeds to step SP24.

In step SP24, the mobile terminal device 20 decodes the voice packet data S2 to prepare for the echo-canceling of the following input voice frame 2 and writes the voice sample data S11 (the output voice frame 2) to the output buffer 18. At this time, (if necessary,) the processing to generate the DTMF (Dual Tone Multi Frequency) signal will be performed.

Then, in step SP25, the mobile terminal device 20 sends the voice sample data S13 (the input voice frame 1 that is) echo-canceled to the output buffer 18 and synthesizes the voice sample data S13 with the voice sample data S11 (the output voice frame 1), and sends it to the speaker 10 via the digital-to-analog converter 9 to perform the side-back-toning. In this connection, the side-back-toning will be performed until the talking is stopped. Thereby, the user can hear the high-tone-quality voice in the mobile terminal device 20.

In step SP26, the voice encoder 15 encodes the voice sample data S13 that is echo-canceled (the input voice frame 1), and when the encoding is terminated, the mobile terminal device 20 enters into the sleep mode and proceeds to step SP27. By the way, the voice packet data will be sent/received between the DSP unit and the modulator 16 and demodulator 5 when in the sleep mode.

In step SP27, the mobile terminal device 20 judges whether the talking should be stopped or not. Here, when the talking should not be stopped, a negative result is obtained and the mobile terminal device 20 returns to step SP22 to repeat the processing again. On the other hand, when the talking should be stopped, an affirmative result is obtained and the mobile terminal device 20 proceeds to step SP28 and terminates the processing.

In the mobile terminal device 20 having the construction as described above, the voice decoder 6 decodes the voice packet data S2 so that the boundary of output voice frames becomes 3 [ms] later than the boundary of input voice frame written to the input buffer 13 (the voice sample data S7), 3 [ms] is the maximum time necessary for the echo-canceling and decoding, and then the decoded data is written to the output buffer 18 as the voice sample data S11.

Since the output buffer 18 has the memory capacity capable of storing the output voice frame for one frame and the voice data for 3 [ms] or more, when the voice decoder 6 sequentially transfers the voice sample data S11 to the output buffer 18, the output buffer 18 can keep the state where the output voice frame is always stored at the same time as the input voice frame to be echo-canceled.

Thereby, the mobile terminal device 20 can write the voice sample data S11 from the voice decoder 6 to the output buffer 18 and eliminate the delayed disturbance in the voice signal from the voice sample data S7 based on the voice sample data S11 and performing the echo-canceling. And the mobile terminal device 20 can omit the complicated processing such that the voice data must be once written to the buffer 7 provided in the conventional mobile terminal device 1 and transferred frame by frame, and providing the buffer 7 becomes unnecessary.

Furthermore, in the mobile terminal device 20, the side-back-toning is performed using the voice sample data S13 that is echo-canceled, thereby, the user can hear the high-tone-quality voice from the speaker 10.

According to the above structure, the mobile terminal device 20 decodes the voice packet data S2 so that the boundary of output voice frames becomes 3 [ms] later than the boundary of input voice frames written to the input buffer 13 (the voice sample data S7), and writes the decoded data to the output buffer 18 having the memory capacity capable of storing the output voice frame for one frame and the voice data for 3 [ms] or more, thereby, providing the buffer 7 (FIG. 1) becomes unnecessary and the echo-canceling can be performed without performing the complicated processing such as transferring the output voice frame to the output buffer 18 frame by frame at the timing that the input voice frame was written. Since the mobile terminal device 20 is not required to provide the buffer 7 of the conventional mobile terminal device 1, the memory capacity can be reduced and the consumed power can be reduced.

Furthermore, in the mobile terminal device 20, the voice sample data S13 that is echo-canceled is used in the side-back-toning, thereby, the user can always hear the high-tone-quality voice from the speaker 10.

Figure 10:
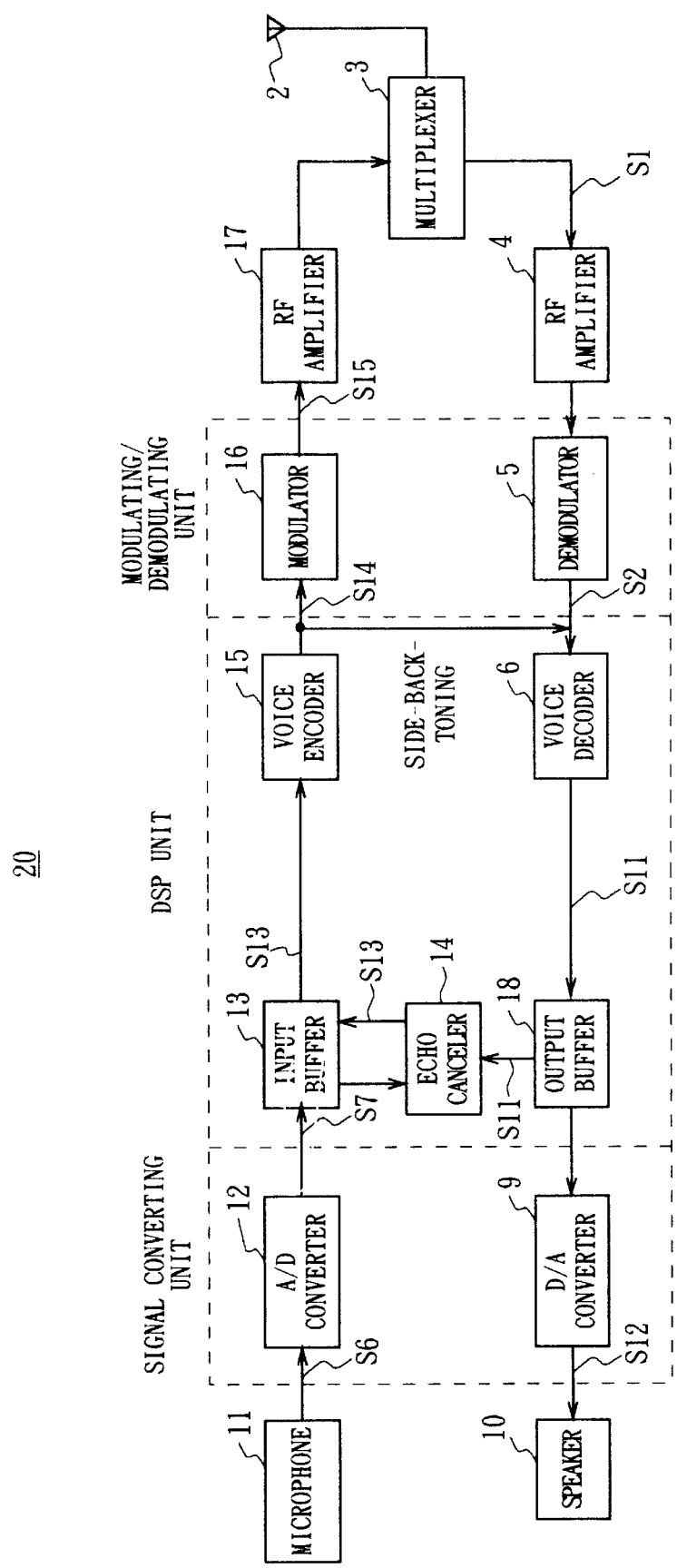
FIG. 10 is a block diagram showing the construction of mobile terminal device according to another embodiment of the present invention.

The embodiment described above has dealt with the case of side-back-toning by sending the voice sample data S13 that is echo-canceled (the input voice frame 1) to the output buffer 18 and synthesizing the voice sample data S13 with the voice sample data S11 (the output frame 1). The present invention, however, is not only limited to this but also may send the voice data from the voice encoder 15 to the voice decoder 6 to perform the side-back-toning provided that the side-back-toning is performed using the voice data that is echo-canceled. In this case, the same effect as the embodiment described above can be obtained. FIG. 10 shows this example.

Furthermore, the embodiments described above have dealt with the case where the boundary of output voice frames is delayed for 3 [ms] relative to the boundary of input voice frames. However, the present invention is not only limited to this but also may set the optimum delay time depending upon the processing time necessary for the echo-canceling and decoding.

Moreover, the embodiments described above have dealt with the case of applying the present invention to the mobile terminal device 20 of the CDMA method in the PCS system. However, the present invention is not only limited to this but also may be applied to the other terminal device using the various kinds of methods, e.g., the TDMA method, provided that the voice is transmitted/received in the form of digital data.

According to the present invention as described above, the input voice frame is written to the input buffer and the delayed disturbance in the voice signal is eliminated based on the output voice frame to cancel the echo, and then the received voice packet data is decoded. Thereby, the boundary between the input voice frames can be set before the boundary between the output voice frames, at least, for the time necessary for said echo-canceling and decoding.

As a result, the output voice frame can always be written at the same time as the input voice frame is written to the input buffer and the delayed disturbance in the voice signal can be eliminated from the input voice frame based on the output voice frame, and thus a telephone system and a voice encoding/decoding method capable of generating the high-tone-quality voice can be realized.

While there have been descriptions in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A radio communication apparatus having an input buffer and an output buffer, and wherein said radio communication apparatus operates in a digital format, converts an audio signal to digital data, writes said digital data to said input buffer for every frame unit, reads and codes said digital data for plural frame units, and RF modulates and transmits said digital data, and wherein said radio communication apparatus demodulates a received signal, decodes a demodulated signal, writes decoded data to said output buffer for every frame unit, reads and converts said decoded data to an analog signal, and generates sound, said radio communication apparatus comprising signal processing means operating so that a timing of an edge between plural frames for writing into said input buffer is set before a predetermined time from a timing of an edge between plural frames for writing into said output buffer, wherein said signal processing means operates to set a start timing of an echo canceling just after a start timing of a frame of said input buffer, to set a start timing of a decoding lust after an end timing of said echo canceling, and to set a start timing of a coding just after an end timing of said decoding.

2. The radio communication apparatus as claimed in claim 1, wherein said predetermined time is a time for an echo canceling process and a decoding process performed by the radio communication apparatus.

3. A radio communication apparatus operating in a digital format, converts an audio signal to digital data, writes said digital data to an input buffer for every frame unit, reads said digital data for plural frame units, codes said digital data for plural frame units with an encoder, and RF modulates and transmits said digital data; and wherein said radio communication apparatus includes a receiving portion that demodulates a received signal, decodes a demodulated signal with a decoder, writes decoded data to an output buffer for every frame unit, reads and converts said decoded data to an analog signal, and generates sound, said radio communication apparatus comprising signal processing means for processing a side-back-tone procedure by supplying echo-canceled input data to said receiving portion, wherein said side-back-tone procedure is performed by supplying an output signal of said input buffer to said output buffer.

4. A radio communication apparatus operating in a digital format, converts an audio signal to digital data, writes said digital data to an input buffer for every frame unit, reads said digital data for plural frame units, codes said digital data for plural frame units with an encoder, and RF modulates and transmits said digital data; and wherein said radio communication apparatus includes a receiving portion that demodulates a received signal, decodes a demodulated signal with a decoder, writes decoded data to an output buffer for every frame unit, reads and converts said decoded data to an analog signal, and generates sound, said radio communication apparatus comprising signal processing means for processing a side-back-tone procedure by supplying echo-canceled input data to said receiving portion, wherein said side-back-tone procedure is performed by supplying an output signal of said encoder to said decoder.

5. A radio communication method using a digital format and including steps of converting an audio signal to digital data, writing said digital data to an input buffer for every frame unit, reading and coding said digital data for plural frame units, and RF modulating and transmitting said digital data; and including steps of demodulating a received signal, decoding a demodulated signal, writing decoded data to an output buffer for every frame unit, reading and converting said decoded data to an analog signal, and generating sound; the method further comprising:

a signal processing step wherein a timing of an edge between plural frames for writing into said input buffer is set before a predetermined time from a timing of an edge between plural frames for writing into said output buffer; and setting a timing time of said edge between plural frames for writing into said input buffer before said predetermined time of said edge between plural frames for writing into said output buffer, wherein said signal processing step sets a start timing of an echo canceling just after a start timing of a frame of said input buffer, sets a start timing of a decoding just after an end timing of said echo canceling, and sets a start timing of a coding just after an end timing of said decoding.

6. The radio communication method as claimed in claim 5, wherein said predetermined time is a time for an echo canceling process and a decoding process.

7. A radio communication method using a digital format and including transmitting steps of converting an audio signal to digital data, writing said digital data to an input buffer for every frame unit, reading said digital data for plural frame units and coding said digital data for plural frame units with an encoder, and RF modulating and transmitting said digital data; and including receiving steps of demodulating a received signal, decoding a demodulated signal with a decoder, writing decoded data to an output buffer for every frame unit, reading and converting said decoded data to an analog signal, and generating sound; the method further comprising a signal processing step for processing a side-back-tone procedure by supplying echo-canceled input data to a receiving portion of a radio communication apparatus, wherein said side-back-tone procedure is performed by supplying an output signal of said input buffer to said output buffer.

8. A radio communication method using a digital format and including transmitting steps of converting an audio signal to digital data, writing said digital data to an input buffer for every frame unit, reading said digital data for plural frame units and coding said digital data for plural frame units with an encoder, and RF modulating and transmitting said digital data; and including receiving steps of demodulating a received signal, decoding a demodulated signal with a decoder, writing decoded data to an output buffer for every frame unit, reading and converting said decoded data to an analog signal, and generating sound; the method further comprising a signal processing step for processing a side-back-tone procedure by supplying echo-canceled input data to a receiving portion of a radio communication apparatus, wherein said side-back-tone procedure is performed by supplying an output signal of said encoder to said decoder.

* * * * *